United States Patent
Nagai et al.

(10) Patent No.: US 10,570,480 B2
(45) Date of Patent: Feb. 25, 2020

(54) METHOD FOR RECOVERING SCANDIUM

(71) Applicant: SUMITOMO METAL MINING CO., LTD., Tokyo (JP)

(72) Inventors: Hidemasa Nagai, Niihama (JP); Keiji Kudo, Niihama (JP); Shin-ya Matsumoto, Niihama (JP); Hiroshi Kobayashi, Niihama (JP); Satoshi Asano, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 169 days.

(21) Appl. No.: 15/557,583

(22) PCT Filed: Dec. 8, 2015

(86) PCT No.: PCT/JP2015/084409
§ 371 (c)(1),
(2) Date: Sep. 12, 2017

(87) PCT Pub. No.: WO2016/151959
PCT Pub. Date: Sep. 29, 2016

(65) Prior Publication Data
US 2018/0087128 A1    Mar. 29, 2018

(30) Foreign Application Priority Data
Mar. 24, 2015 (JP) .................... 2015-060627

(51) Int. Cl.
*C22B 3/42* (2006.01)
*C22B 3/08* (2006.01)
(Continued)

(52) U.S. Cl.
CPC .......... *C22B 3/42* (2013.01); *C01F 17/0006* (2013.01); *C22B 3/08* (2013.01); *C22B 3/44* (2013.01); *C22B 59/00* (2013.01); *Y02P 10/234* (2015.11)

(58) Field of Classification Search
CPC .... C22B 3/08; C22B 3/42; C22B 3/44; C22B 59/00; C01F 17/0006
See application file for complete search history.

(56) References Cited

U.S. PATENT DOCUMENTS

| | | | |
|---|---|---|---|
| 9,347,115 B2 * | 5/2016 | Maeba | ............... C22B 3/44 |
| 2016/0047014 A1 | 2/2016 | Ozaki et al. | |
| 2017/0260606 A1 * | 9/2017 | Kasaini | ............... C22B 3/10 |

FOREIGN PATENT DOCUMENTS

| | | |
|---|---|---|
| CA | 2890572 A1 | 11/2014 |
| CN | 103361486 A | 10/2013 |

(Continued)

OTHER PUBLICATIONS

Renata D. Abreu et al., "Purification of rare earth elements from monazite sulphuric acid leach liquor and the production of high-purity ceric oxide", Minerals Engineering, vol. 23, No. 6, May 1, 2010, pp. 536-540. (cited in the Sep. 19, 2018 search report issued for EP15886511.3).

(Continued)

*Primary Examiner* — Tima M. McGuthry-Banks
(74) *Attorney, Agent, or Firm* — Locke Lord LLP; James E. Armstrong, IV; Nicholas J. DiCeglie, Jr.

(57) ABSTRACT

The invention provides a method for recovering scandium from an acidic solution containing scandium. The method having [a] a precipitation step wherein sodium sulfate is added into the acidic solution containing scandium to obtain a precipitate of a scandium double sulfate; [b] a neutralization step wherein pure water is added to the precipitate of a scandium double sulfate to dissolve the precipitate of a scandium double sulfate therein, and scandium hydroxide is obtained by adding a neutralizing agent into the dissolution liquid; and [c] a re-dissolution step wherein an acid is added to the scandium hydroxide obtained in the neutralization step, so that a scandium dissolution after purification, in which the scandium hydroxide is dissolved, is obtained.

20 Claims, 3 Drawing Sheets

(51) Int. Cl.
      *C22B 59/00*       (2006.01)
      *C22B 3/44*        (2006.01)
      *C01F 17/00*       (2006.01)

(56) References Cited

FOREIGN PATENT DOCUMENTS

| EP | 2597164 A1 | 5/2013 |
|---|---|---|
| JP | 54-089904 A | 7/1979 |
| JP | 03-173725 A | 7/1991 |
| JP | 09-176756 A | 7/1997 |
| JP | 09-291320 A | 11/1997 |
| JP | 2004-175652 A | 6/2004 |
| JP | 2014-218719 A | 11/2014 |
| WO | 03/104149 A1 | 12/2003 |

OTHER PUBLICATIONS

Gupta C K et al., "Extractive Metallurgy of rare earths", International Materials Reviews, ASM International, Materials Park, US, vol. 37, No. 5, Jan. 1, 1992, pp. 197-248. (cited in the Sep. 19, 2018 search report issued for EP15886511.3).
Extended European Search Report dated Sep. 19, 2018, issued to EP Patent Application No. 15886511.3.
Office Action dated Aug. 2, 2018, issued to CN Patent Application No. 201580077859.5.
International Search Report dated Mar. 1, 2016, issued for PCT/JP2015/084409.

\* cited by examiner

METHOD FOR RECOVERING SCANDIUM

TECHNICAL FIELD

The present invention relates to a method for recovering scandium, and more specifically to a method for recovering high purity scandium from an acidic solution that contains scandium which is extracted from nickel oxide ore or the like by precipitating scandium in the form of double sulfates and thus separating scandium from impurities.

BACKGROUND ART

Scandium is extremely valuable as an additive for high-strength alloys and an electrode material for fuel cells. However, scandium has not yet been used widely due to the small production quantity and high cost thereof.

Incidentally, scandium is contained in nickel oxide ore such as laterite ore and limonite ore in a trace amount. However, the grade of nickel contained in the nickel oxide ore is low, and the nickel oxide ore has not been thus industrially utilized as a raw material of nickel for a long time. Hence, studies on industrially recovering scandium from the nickel oxide ore have been hardly conducted either.

In recent years, however, the HPAL process has been emerging as a practical method, in which nickel oxide ore is introduced into a pressure vessel along with sulfuric acid, and heated at a high temperature of about 240° C. to 260° C. to allow solid-liquid separation into a leachate containing nickel and a leach residue. In this HPAL process, it is possible to separate the impurities by adding a neutralizing agent to the leachate thus obtained and then to recover nickel as nickel sulfide by adding a sulfurizing agent to the resulting leachate. Thereafter, it is possible to obtain electric nickel or a nickel salt compound by subjecting the resulting nickel sulfide to a known nickel purification process.

In the case of using the HPAL process as described above, scandium contained in the nickel oxide ore is contained in the leachate along with nickel (see Patent Document 1). Thereafter, scandium is contained in the acidic solution (post-sulfuration liquid) after the addition of the sulfurizing agent while nickel is recovered as nickel sulfide as a neutralizing agent is added to the leachate obtained in the HPAL process to separate impurities and subsequently a sulfurizing agent is added to the resulting leachate, and it is thus possible to effectively separate nickel and scandium from each other by using the HPAL process.

As a method for recovering scandium from the acidic solution described above, a method for recovering scandium by adsorbing scandium to a chelating resin or the like having an iminodiacetate salt as a functional group to separate scandium from the impurities and to enrich scandium is proposed, for example, in Patent Document 2.

Patent Document 2 discloses a method for producing high purity scandium oxide from a substance containing scandium in a trace amount. Specifically, a method for producing high purity scandium oxide is disclosed, which includes a leaching step of obtaining a scandium-containing solution from an oxide containing scandium in a trace amount, a liquid adjusting step, an extraction step of forming a chelating resin which has adsorbed scandium, a washing step of washing the scandium-adsorbed chelating resin with a dilute acid, a backward extraction step of eluting the scandium-adsorbed chelating resin with a strong acid to obtain a scandium-containing solution, a precipitation step of obtaining a precipitate of scandium from the scandium-containing solution by using a precipitant, and a step of calcining the precipitate.

However, in the case of using this method described in Patent Document 2 on its own, although the distribution of iron, aluminum, chromium or the like into the eluate is significantly minor, they are contained in a larger amount as compared to the scandium contained in the raw material, and it thus takes time and labor to repeat the adsorption and elution a number of times. In addition, some impurities are distributed in the eluate to the same extent as scandium, and it is thus difficult to separate scandium from the impurities in some cases.

Further, Patent Document 3 discloses a method for recovering high purity scandium oxide from a scandium-containing solution by a solvent extraction method. Specifically, it is a method in which, first, an organic solvent prepared by diluting 2-ethylhexylsulfonic acid-mono-2-ethylhexyl with kerosene is added to a scandium-containing solution of an aqueous phase containing at least one or more kinds of iron, aluminum, calcium, yttrium, manganese, chromium, or magnesium in addition to scandium to extract the scandium component into the organic solvent. Subsequently, in order to separate yttrium, iron, manganese, chromium, magnesium, aluminum, and calcium extracted into the organic solvent along with scandium, scrubbing is performed by adding an aqueous solution of hydrochloric acid to the organic solvent to remove yttrium, iron, manganese, chromium, magnesium, aluminum, and calcium, and an aqueous solution of sodium hydroxide is then added to the resulting organic solvent to convert the scandium remaining in the organic solvent into a slurry containing $Sc(OH)_3$. Thereafter, $Sc(OH)_3$ obtained by filtering this slurry is dissolved with hydrochloric acid to obtain an aqueous solution of scandium chloride, oxalic acid is added to this resulting solution to form a precipitate of scandium oxalate, and the precipitate is filtered to separate iron, manganese, chromium, magnesium, aluminum, and calcium into the filtrate, and then the precipitate filtered is calcined, thereby obtaining high purity scandium oxide.

However, in the case of using the solvent extraction method, it is required to handle a large amount of solvent since scandium is contained in the nickel oxide ore in an extremely small amount and the concentration thereof is low and there are difficulties from the viewpoint of recovery rate and cost since the capacity of equipment increases.

As described above, a technique to efficiently take out and utilize scandium or scandium oxide contained in the nickel oxide ore has not been found out.

Patent Document 1: Japanese Unexamined Patent Application, Publication No. H03-173725
Patent Document 2: Japanese Unexamined Patent Application, Publication No. H09-176756
Patent Document 3: Japanese Unexamined Patent Application, Publication No. H09-291320

DISCLOSURE OF THE INVENTION

Problems to be Solved by the Invention

The present invention is made in view of the above actual circumstances. An object of the present invention is to provide a method for recovering scandium, which enables the convenient and efficient recovery of high grade scandium from an acidic solution containing scandium.

Means for Solving the Problems

The present inventors have conducted extensive studies to solve the aforementioned problems. As a result, the present inventors have found out that high grade scandium can be recovered conveniently and efficiently by using an acidic solution containing scandium as a raw material to cause a reaction to generate double sulfates, dissolving the resulting double sulfates of scandium, and recovering scandium from the scandium solution after purification. Then the present invention has been completed. That is, the present invention can provide the following.

(1) A first embodiment of the present invention provides a method for recovering scandium, comprising: obtaining a scandium solution after purification from an acidic solution containing scandium by a double sulfates precipitation step including the following steps [A] to [C]; and subsequently recovering scandium from the scandium solution obtained.
[A] A precipitation step of adding sodium sulfate to the acidic solution containing scandium to obtain a precipitate of double sulfates of scandium.
[B] A neutralization step of adding pure water to the precipitate of double sulfates of scandium obtained in the precipitation step to dissolve the precipitate and adding a neutralizing agent to a resulting solution to obtain scandium hydroxide.
[C] A redissolution step of adding an acid to scandium hydroxide obtained in the neutralization step to obtain a scandium solution after purification having scandium hydroxide dissolved.

(2) A second embodiment of the present invention provides the method for recovering scandium according to the first embodiment, comprising an enrichment step of generating a precipitate of scandium from the acidic solution containing scandium and adding an acid to the precipitate to dissolve the precipitate, in which the acidic solution obtained in the enrichment step is subjected to a treatment in the double sulfates precipitation step.

(3) A third embodiment of the present invention provides the method for recovering scandium according to the second embodiment, in which a neutralizing agent or oxalic acid is added to the acidic solution containing scandium to generate a precipitate of scandium and an acid is added to the precipitate to dissolve the precipitate in the enrichment step.

(4) A fourth embodiment of the present invention provides the method for recovering scandium according to the second embodiment, in which the enrichment step comprises: a first enrichment step of adding a neutralizing agent to the acidic solution containing scandium to generate a precipitate of scandium and adding an acid to the precipitate to dissolve the precipitate; and a second enrichment step of adding oxalic acid to the solution obtained in the first enrichment step to generate a precipitate of scandium oxalate and adding an acid to the precipitate to dissolve the precipitate.

(5) A fifth embodiment of the present invention provides the method for recovering scandium according to any one of the first to fourth embodiments, comprising an oxalate-formation step of adding oxalic acid to the scandium solution after purification to obtain a crystal of scandium oxalate, in which the crystal of scandium oxalate obtained in the oxalate-formation step is subjected to a treatment in the roasting step.

(6) A sixth embodiment of the present invention provides the method for recovering scandium according to any one of the first to fifth embodiments, in which scandium hydroxide is obtained by adjusting a pH of the solution to a range of 8 to 9 by addition of a neutralizing agent in the neutralization step in the double sulfates precipitation step.

(7) A seventh embodiment of the present invention provides the method for recovering scandium according to any one of the first to sixth embodiments, in which the acidic solution containing scandium is a solution obtained through a leaching step of leaching the nickel oxide ore with sulfuric acid under high temperature and high pressure to obtain a leachate, a neutralization step of adding a neutralizing agent to the leachate to obtain a neutralized precipitate containing impurities and a post-neutralization liquid, a sulfuration step of adding a sulfurizing agent to the post-neutralization liquid to obtain a nickel sulfide and a post-sulfuration liquid, and an ion exchange step of bringing the post-sulfuration liquid into contact with a chelating resin to allow scandium contained in the post-sulfuration liquid to be adsorbed by the chelating resin and thus to obtain a scandium eluate.

Effects of the Invention

According to the present invention, high grade scandium can be recovered conveniently and efficiently from nickel oxide ore.

PREFERRED MODE FOR CARRYING OUT THE INVENTION

Below, specific embodiments of the present invention (hereinafter referred to as the "present embodiments") will be described in more detail, but the present invention is not limited to the following embodiments and can be implemented with appropriate modifications made without departing from the spirit of the present invention.
<<1. Method for Recovering Scandium>>
The method for recovering scandium according to the present embodiment is a method for recovering high purity scandium from an acidic solution containing scandium (hereinafter, also referred to as the "scandium-containing acidic solution"). Specifically, in this method for recovering scandium, a scandium solution after purification is obtained from a scandium-containing acidic solution by a double sulfates precipitation step including the following steps [A] to [C] and subsequently the scandium solution obtained is roasted to obtain scandium oxide.
[A] A precipitation step of adding sodium sulfate to the acidic solution containing scandium to obtain a precipitate of double sulfates of scandium.
[B] A neutralization step of adding pure water to the precipitate of double sulfates of scandium obtained in the precipitation step to dissolve the precipitate and adding a neutralizing agent to the resulting solution to obtain scandium hydroxide.
[C] A redissolution step of adding an acid to the scandium hydroxide obtained in the neutralization step to obtain a scandium solution after purification in which scandium hydroxide is dissolved.

In this way, in the method for recovering scandium according to the present embodiment, a precipitate of double sulfates is formed when purifying and recovering scandium. According to such a method, it is possible to more efficiently separate the impurities, such as aluminum, iron, nickel, magnesium, and manganese, which are contained in the starting liquid for recovering scandium and to perform an efficient and stable operation using compact equipment, for example, even when using a raw material containing a large amount of impurities such as nickel oxide ore.

Figure 1:
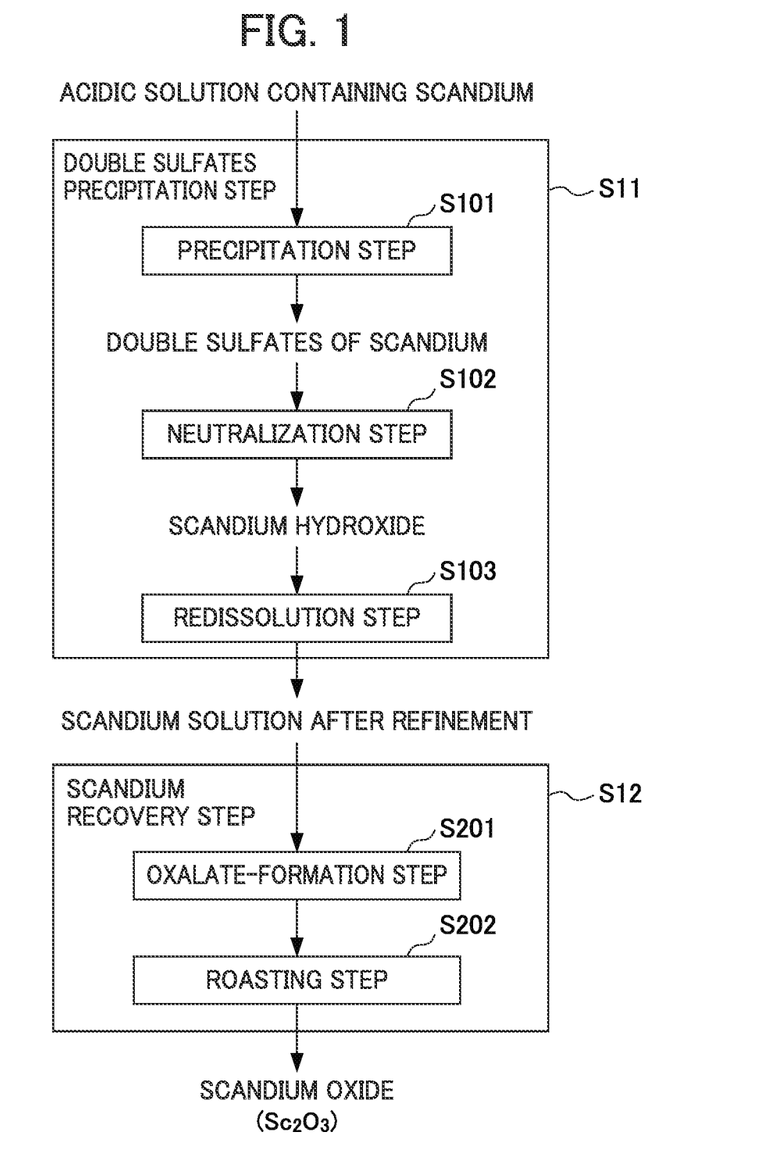
FIG. 1 shows a flow diagram for illustrating the flow of a method for recovering scandium.

FIG. 1 shows a flow diagram for illustrating the flow of the method for recovering scandium according to the present embodiment. As illustrated in the flow diagram of FIG. 1, this method for recovering scandium comprises a double sulfates precipitation step S11 of generating a precipitate of double sulfates from an acidic solution of a scandium-containing solution and purifying the precipitate and a scandium recovery step S12 of recovering the scandium from the scandium solution after purification. Hereinafter, each step will be specifically described.

<1-1. Double Sulfates Precipitation Step>

(1) Double Sulfates Precipitation Step

The double sulfates precipitation step S11 is a step of generating a precipitate of double sulfates from a scandium-containing acidic solution to be the recovery starting liquid for recovering scandium and purifying the precipitate.

Specifically, the double sulfates precipitation step S11 comprises a precipitation step S101 of generating a precipitate of double sulfates from a scandium-containing acidic solution, a neutralization step S102 of neutralizing the solution obtained by dissolving the precipitate of double sulfates, and a redissolution step S103 of redissolving the scandium hydroxide obtained by neutralization.

[A] Precipitation Step

In the precipitation step S101, crystals of sodium sulfate are added to the scandium-containing acidic solution and crystals (precipitates) in the form of double sulfates (double sulfates of scandium) containing scandium are precipitated and generated based on a reaction to generate double sulfates. By this treatment in the precipitation step S101, it is possible to separate the impurities and scandium which are contained in the scandium-containing acidic solution from each other.

The pH of the scandium-containing acidic solution before sodium sulfate is added thereto is preferably in a range of 0 to 1 and more preferably about 0.5. There is a possibility that the solubility of the double sulfates of scandium increases, the double sulfates of scandium generated redissolve, and the recovery rate of scandium thus decreases when the pH of the solution exceeds 1. In addition, there is also a possibility that the filterability at the time of solid-liquid separation deteriorates as the viscosity of the double sulfates of scandium increases. Meanwhile, it is economically disadvantageous that the pH of the solution is less than 0 since the amount of neutralizing agent to be required in the subsequent step (neutralization step S102) increases.

The addition amount of sodium sulfate is preferably 200 g/L to 400 g/L and particularly preferably about 300 g/L with respect to the liquid amount of the scandium-containing acidic solution. There is a possibility that the solubility of double sulfates of scandium increases, the double sulfates of scandium generated redissolve, and the recovery rate of scandium thus decreases when the addition amount is less than 200 g/L. Meanwhile, the viscosity of double sulfates of scandium generated increases and a decrease in solid-liquid separation and handling properties is caused when the addition amount exceeds 400 g/L.

The double sulfates of scandium precipitated by the reaction to generate double sulfates are subjected to solid-liquid separation by a known method to be separated from the post-filtration liquid (mother liquor).

Thereafter, a sodium sulfate solution as a washing liquid is added to the double sulfates of scandium and repulp washing is performed. At this time, the addition amount of sodium sulfate in the washing liquid is preferably in a range of 200 g/L to 400 g/L and particularly preferably about 300 g/L in the same manner as the case of generating double sulfates of scandium. There is a possibility that the concentration is too low, the double sulfates of scandium dissolve, and a recovery loss of scandium occurs when the concentration of sodium sulfate is less than 200 g/L. Meanwhile, the concentration is too high, the cost increases, the viscosity increases, and the washing effect decreases when the concentration exceeds 400 g/L.

In addition, the slurry concentration at the time of repulp washing is preferably in a range of 100 to 300 wet-g/L. There is a possibility that the loss of scandium increases when the slurry concentration is less than 100 g/L. Meanwhile the amount of washing liquid increases and the washing effect decreases when the slurry concentration exceeds 300 g/L.

[B] Neutralization Step

In the neutralization step S102, pure water is added to the precipitate of double sulfates of scandium obtained in the precipitation step S101 to dissolve the precipitate and a neutralizing agent is added to the resulting solution (solution of double sulfates) to obtain scandium hydroxide. The double sulfates of scandium obtained in the precipitation step S101 is a precipitate obtained by separating impurity components and the solution obtained by dissolving these double sulfates of scandium is a solution from which impurities are removed.

The double sulfates of scandium and pure water in the minimum liquid amount required for stirring are mixed and stirred when pure water is added to the double sulfates of scandium obtained to dissolve the double sulfates of scandium. By dissolving the double sulfates of scandium while performing a stirring treatment, it is possible to prevent the undissolved substance of double sulfates of scandium from remaining.

As a measure of liquid amount, the liquid amount is set to an amount so that the slurry concentration of double sulfates of scandium is, for example, about 50 g/L to 100 g/L. Operability decreases as the liquid amount increases when the slurry concentration is lower than 50 g/L. Meanwhile, it is not preferable that the slurry concentration is higher than 100 g/L since double sulfates of scandium are not completely dissolved, undissolved substances remain, and the recovery rate of scandium thus decreases in some cases.

Moreover, in the neutralization step S102, a neutralizing agent is added to the solution of double sulfates of scandium in which the double sulfates of scandium is dissolved to generate a precipitate of scandium hydroxide after purification. As the pH condition, the pH is adjusted to 6 to 7 by addition of a neutralizing agent. This makes it possible to efficiently obtain a precipitate of scandium hydroxide after purification.

There is no particular limitation to the neutralizing agent, but it is preferable to use a water-soluble neutralizing agent, specifically, sodium hydroxide from the viewpoint of avoiding mixing of the product derived from the neutralizing agent added as an impurity.

[C] Redissolution Step

In the redissolution step S103, sulfuric acid or hydrochloric acid is added to the scandium hydroxide after purification that is obtained in the neutralization step S102 to dissolve the scandium hydroxide and thus to obtain a scandium solution after purification. The scandium hydroxide obtained in the neutralization step S102 is a purified precipitate obtained by further separating impurity components, and a solution obtained by dissolving this scandium hydroxide with an acid is a purified solution from which impurities are even further removed.

As a measure of dissolution of scandium hydroxide with an acid, the pH is adjusted to be in a range of 0 to 0.5 in consideration of ensuring the solubility at which, for example, an oxalate salt can be generated in the subsequent step (scandium recovery step S12), and at the same time, the separation of impurities and the like. There is a possibility that the solubility of the oxalate salt of scandium (scandium oxalate) to be generated in the subsequent step increases and the recovery rate of scandium decreases when the pH is too low, lower than 0. Meanwhile, it is not preferable that the pH exceeds 0.5 since there is a possibility that the impurities in the solution obtained by dissolving scandium hydroxide form a precipitate in the subsequent step to lower the purity of scandium.

Specifically, for example, in the case of dissolving scandium hydroxide with sulfuric acid, scandium hydroxide is dissolved by adding sulfuric acid having a concentration of about 60% by weight so as to maintain the pH in a range of 0 to 0.5 while adding water to scandium hydroxide to form a slurry, thereby obtaining a scandium solution after purification.

As described above, in the method for recovering scandium according to the present embodiment, a precipitate of double sulfates of scandium is generated by using a scandium-containing acidic solution to separate scandium from impurities such as nickel and aluminum. According to such a method, it is possible to efficiently separate scandium from the impurities and thus to recover high purity scandium without using expensive chemicals, solvents, and the like.

(2) Enrichment Step

Here, before each treatment in the double sulfates precipitation step S11 described above is performed, the scandium-containing acidic solution that is the reaction starting liquid for the reaction to generate double sulfates may be subjected to an enrichment treatment. Specifically, it is possible to separate scandium from impurities other than scandium by forming scandium contained in the scandium-containing acidic solution before being supplied to each treatment in the double sulfates precipitation step S11 into a precipitate and then to perform an enrichment treatment to obtain an enriched scandium liquid by dissolving the precipitate of scandium generated with an acid such as sulfuric acid, hydrochloric acid, or nitric acid.

By subjecting the scandium-containing acidic solution to an enrichment treatment in this way, it is possible to greatly remove impurities contained in the acidic solution, to save the time and labor and the like for the treatment in the subsequent double sulfates precipitation step S11, and thus to cut down the cost. Specifically, it is possible to greatly remove the impurities, thus to decrease the addition amount of sodium sulfate in the double sulfates precipitation step S11 and the scale of the treatment equipment to a compact scale, and to cut down the capital investment. In addition, it is possible to control the concentration of the starting liquid for the treatment in the double sulfates precipitation step S11 in a certain range and to further stabilize this scandium recovery operation.

Note that any acid of sulfuric acid, hydrochloric acid, or nitric acid may be used as described above but sulfuric acid is more preferably used when dissolving the precipitate obtained in this enrichment step.

Examples of the method for the enrichment treatment in the enrichment step may include a method by neutralization for hydroxide formation or oxalate formation, or both the neutralization for hydroxide formation and the oxalate formation may be performed. Although any enrichment method can be employed in this way, it is preferable to dissolve the resulting precipitate (for example, a hydroxide or an oxalate salt) in the vicinity of the solubility thereof. By dissolving the resulting precipitate in the vicinity of the solubility thereof, it is possible to precipitate a solid once and then to redissolve the solid so as to have an arbitrary concentration, and it is thus possible to arbitrarily select the scandium concentration and to increase the scandium concentration as much as possible. It is extremely industrially preferable from the viewpoint that this makes it possible to decrease the liquid amount in the treatment in the double sulfates precipitation step S11 that is the next step and eventually the equipment scale.

Hereinafter, as the method for the enrichment treatment, a method for enriching a scandium-containing solution that is the raw material for generating double sulfates of scandium will be specifically described by taking the three methods of neutralization for hydroxide formation, oxalate formation, and concurrent use of neutralization for hydroxide formation and oxalate formation as examples.

[Neutralization for Hydroxide Formation]

In the method by neutralization for hydroxide formation, a neutralizing agent is added to a scandium-containing acidic solution (for example, a scandium eluate obtained by a treatment in an ion exchange step as described later) to obtain a precipitate of a hydroxide (scandium hydroxide) and thus to perform solid-liquid separation, and the precipitate of a hydroxide obtained is dissolved with an acid to obtain an acidic solution after enrichment.

As the neutralizing agent, a conventionally known one can be used, and examples thereof may include calcium carbonate, slaked lime, and sodium hydroxide. Note that there is a possibility that gypsum (calcium sulfate) is generated and mixed in scandium when the neutralizing agent is a neutralizing agent containing a calcium component in a case in which the scandium eluate obtained in the ion exchange step is a sulfuric acid solution. Hence, those belonging to the kinds that do not generate a solid such as sodium hydroxide are preferable as the neutralizing agent.

As the pH condition, it is preferable to adjust the pH to a range of 6 to 9 by addition of a neutralizing agent. There is a possibility that the neutralization insufficiently proceeds and scandium cannot be sufficiently recovered when the pH is lower than 6. Meanwhile, it is not preferable that the pH exceeds 9 since the amount of neutralizing agent used increases and the cost thus increases.

[Oxalate Formation]

In addition, in the method by oxalate formation, oxalic acid is added to a scandium-containing acidic solution to obtain crystals of an oxalate salt (scandium oxalate).

At this time, it is preferable to add oxalic acid while adjusting and maintaining the pH in a range of 0 to 0.5 as the pH condition of the scandium-containing acidic solution. There is a possibility that the solubility of the oxalate salt of scandium increases and the oxalate salt generated redissolves to decrease the recovery rate of scandium when the pH is lower than 0 to be in a strongly acidic region. Meanwhile, it is not preferable that the pH is too high, exceeding 0.5 since impurities contained in the scandium-containing acidic solution form a precipitate and are mixed in the oxalate salt of scandium to lower the purity of scandium.

The addition amount of oxalic acid is preferably an amount to be in a range of 1.05 to 1.2 times the equivalent amount required for precipitating scandium as an oxalate salt. There is a possibility that the generation of a precipitate of scandium oxalate is insufficient and the entire amount of scandium cannot be recovered when the addition amount is less than 1.05 times the equivalent amount required. Meanwhile, it is not preferable that the addition amount exceeds 1.2 times the equivalent amount required since the solubility of scandium oxalate increases, and as a result, the scandium precipitated redissolves and the recovery rate thereof decreases.

The scandium oxalate obtained by oxalate formation in this way is dissolved by adding an acid in the same manner as the treatment of neutralization for hydroxide formation described above to obtain an acidic solution after enrichment.

[Concurrent Use of Neutralization for Hydroxide Formation and Oxalate Formation]

In addition, it is also possible to perform the enrichment treatment by a method using the neutralization for hydroxide formation and the oxalate formation described above concurrently. Specifically, first, a neutralizing agent is added to a scandium-containing acidic solution as described above to obtain a precipitate containing scandium hydroxide (neutralization for hydroxide formation: first enrichment step). Thereafter, hydrochloric acid is added to the precipitate of scandium hydroxide to dissolve the precipitate. Next, oxalic acid is added to the solution obtained through dissolution as described above to precipitate crystals of scandium oxalate (oxalate formation: second enrichment step). Thereafter, an acid is added to the crystals to dissolve the crystals, thereby obtaining an acidic solution after enrichment.

By concurrently using the neutralization for hydroxide formation and the oxalate formation in the enrichment treatment in this way, it is possible to even more effectively remove impurities contained in the acidic solution and to save the time and labor and the like for the treatment in the subsequent double sulfates precipitation step S11.

<1-2. Scandium Recovery Step>

The scandium recovery step S12 is a step of recovering scandium from the scandium solution after purification that is obtained through the double sulfates precipitation step S11 described above.

There is no particular limitation to the method for recovering scandium, but as exemplified in the flow diagram of FIG. 1, examples thereof may include a method comprising an oxalate-formation step S201 of adding oxalic acid to a scandium solution to obtain crystals of scandium oxalate and a roasting step S202 of roasting the crystals of scandium oxalate obtained to obtain scandium oxide.

In this way, according to the method for generating a solid crystal of scandium oxalate and subjecting the scandium oxalate obtained to roasting to obtain scandium oxide, it is possible to separate and remove any trace amount of impurities remaining in the scandium solution here and to recover even higher purity scandium in the form of scandium oxide.

Hereinafter, the scandium recovery step S12 will be specifically described with reference to an example comprising the oxalate-formation step S201 and the roasting step S202 of obtaining scandium oxide.

(1) Oxalate-Formation Step (Scandium Precipitation Step)

In the oxalate-formation step S201, an oxalate-formation treatment is performed in which oxalic acid is added to the scandium solution obtained through the double sulfates precipitation step S11 and solid crystals of scandium oxalate are precipitated based on scandium in the scandium solution.

According to this oxalate-formation treatment, it is possible to improve the handling properties such as filterability and to efficiently recover scandium.

The addition amount of oxalic acid is preferably an amount to be in a range of 1.05 to 1.2 times the equivalent amount required for precipitating scandium in the scandium solution as an oxalate salt. There is a possibility that the entire amount of scandium cannot be recovered when the addition amount is less than 1.05 times the equivalent amount required. Meanwhile, it is not preferable that the addition amount exceeds 1.2 times the equivalent amount required since scandium redissolves and the recovery rate thereof decreases as the solubility of scandium oxalate increases and the amount of the oxidizing agent such as sodium hypochlorite used increases in order to decompose excessive oxalic acid.

(2) Roasting Step

The roasting step S202 is a step of washing the precipitate of scandium oxalate obtained in the oxalate-formation step with water and drying and roasting (calcining) the washed precipitate. It is possible to obtain extremely high grade scandium oxide through the roasting treatment in this roasting step S202.

There is no particular limitation to the condition for the roasting treatment, but, for example, the precipitate of scandium oxalate may be placed in a tubular furnace and heated at about 900° C. for about 2 hours. Note that it is industrially preferable to use a continuous furnace such as a rotary kiln since it is possible to perform drying and roasting by using the same apparatus.

<<2. Recovery of Scandium from Leachate in Hydrometallurgy Method for Nickel Oxide Ore>>

<2-1. Use of Leachate of Nickel Oxide Ore>

As the acidic solution containing scandium (scandium-containing acidic solution) of the solution that is the target of recovery in the method for recovering scandium according to the present embodiment, for example, a leachate to be obtained through a hydrometallurgy process of nickel oxide ore can be used.

Figure 2:
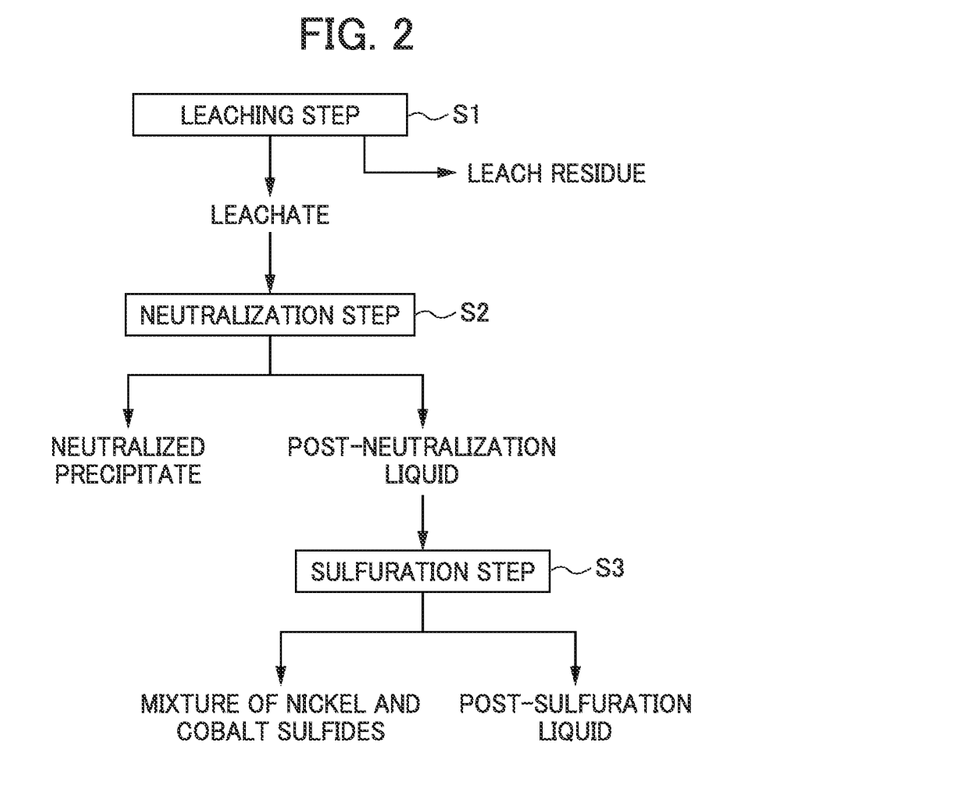
FIG. 2 shows a flow diagram for illustrating the flow of a hydrometallurgy process of nickel oxide ore.

FIG. 2 shows a flow diagram for illustrating the flow of a hydrometallurgy process of nickel oxide ore. More specifically, in the present embodiment, a post-sulfuration liquid obtained by a hydrometallurgy process of nickel oxide ore which comprises a leaching step S1 of leaching nickel oxide ore with sulfuric acid under high temperature and high pressure to obtain a leachate, a neutralization step S2 of adding a neutralizing agent to the leachate to obtain a neutralized precipitate containing impurities and a post-neutralization liquid, and a sulfuration step S3 of adding a sulfurizing agent to the post-neutralization liquid to obtain a nickel sulfide and a post-sulfuration liquid can be used as the scandium-containing acidic solution. Hereinafter, the flow of the hydrometallurgy process of nickel oxide ore will be described.

(1) Leaching Step

The leaching step S1 is a step of forming a leach slurry comprising a leachate and a leach residue by adding sulfuric acid to the slurry of nickel oxide ore and subjecting the mixture to a stirring treatment at a temperature of 240° C. to 260° C., for example, by using a high temperature pressurized vessel (autoclave) or the like.

Here, examples of nickel oxide ore include so-called laterite ore such as limonite ore and saprolite ore. The content of nickel in laterite ore is usually 0.8 to 2.5 wt %, and contained as a hydroxide or a silica magnesia (magnesium silicate) mineral. Further, these types of nickel oxide ore contain scandium.

In the leaching step S1, solid-liquid separation is performed to obtain a leachate containing nickel, cobalt, scandium, and the like; and a leach residue as a hematite while washing the resulting leach slurry comprising the leachate and the leach residue. In the above solid-liquid separation treatment, for example, the leach slurry is mixed with a washing liquid, and then solid-liquid separation is performed in a solid-liquid separation apparatus such as a thickener using an aggregating agent supplied from an apparatus for supplying an aggregating agent and the like. Specifically, the leach slurry is first diluted with the washing liquid, and then the leach residue in the slurry is condensed as a precipitate in the thickener. Note that in the above solid-liquid separation treatment, solid-liquid separation is preferably performed while washing the leach slurry by a multi-stage washing process using multistaged solid-liquid separation cells such as thickeners.

(2) Neutralization Step

The neutralization step S2 comprises adding a neutralizing agent to the leachate obtained from the aforementioned leaching step S1 to adjust pH, thereby obtaining a neutralized precipitate containing impurity elements and a post-neutralization liquid. After the neutralization treatment in the above neutralization step S2, valuable metals such as nickel, cobalt, and scandium will be contained in the post-neutralization liquid while most impurities including iron and aluminum will be included in the neutralized precipitate.

For the neutralizing agent, publicly known substances may be used, including, for example, calcium carbonate, slaked lime, sodium hydroxide, and the like.

In the neutralization treatment of the neutralization step S2, the pH is preferably adjusted to the range of 1 to 4, preferably to the range of 1.5 to 2.5 while preventing oxidation of the leachate separated. When the pH is less than 1, neutralization may be insufficient, and the neutralized precipitate and the post-neutralization liquid may not be separated. On the other hand, when the pH is more than 4, not only impurities including aluminum but also valuable metals such as scandium and nickel may be contained in the neutralized precipitate.

(3) Sulfuration Step

The sulfuration step S3 comprises adding a sulfurizing agent to the post-neutralization liquid obtained from the aforementioned neutralization step S12 to obtain nickel sulfide and a post-sulfuration liquid. Nickel, cobalt, zinc, and the like are transformed into sulfides, and scandium and the like is contained in the post-sulfuration liquid after the sulfuration treatment in the above sulfuration step S3.

Specifically, in the sulfuration step S3, a sulfurizing agent such as gaseous hydrogen sulfide, sodium sulfide, or hydrogenated sodium sulfide is blown into the resulting post-neutralization liquid to generate sulfides (mixture of nickel and cobalt sulfides) comprising nickel and cobalt with less impurity components and a post-sulfuration liquid having a low and stabilized level of nickel concentration and containing scandium and the like.

In the sulfuration treatment of the sulfuration step S3, sedimentation and separation treatment of a slurry of the mixture of nickel and cobalt sulfides is performed using a sedimentation apparatus such as a thickener to separate and recover the mixture of nickel and cobalt sulfides from the bottom of the thickener. Meanwhile, the post-sulfuration liquid as an aqueous solution component is overflown for recovery.

In the method for recovering scandium according to the present embodiment, the post-sulfuration liquid to be obtained through each step in the hydrometallurgy process of nickel oxide ore as described above can be used as a scandium-containing acidic solution that is a raw material of source liquid that is the target of the scandium recovery treatment.

<2-2. Utilization of Scandium Eluate Obtained Through Ion Exchange Treatment>

It is general that various substances are contained in the post-sulfuration liquid obtained by the hydrometallurgy process of nickel oxide ore described above as impurity elements and the contents thereof are also larger than that of the scandium to be recovered. Hence, in the case of using the post-sulfuration liquid obtained by the hydrometallurgy process of nickel oxide ore as the raw material of source liquid for recovering scandium, it is preferable to roughly separate the impurity elements by subjecting the post-sulfuration liquid to a treatment such as ion exchange.

Hereinafter, a case in which the post-sulfuration liquid obtained is subjected to an ion exchange treatment will be described as an example. In the present embodiment, by subjecting the post-sulfuration liquid to an ion exchange treatment in this way, it is possible to separate and remove various impurity elements contained in the solution, to enrich scandium, and thus to recover higher purity scandium.

Figure 3:
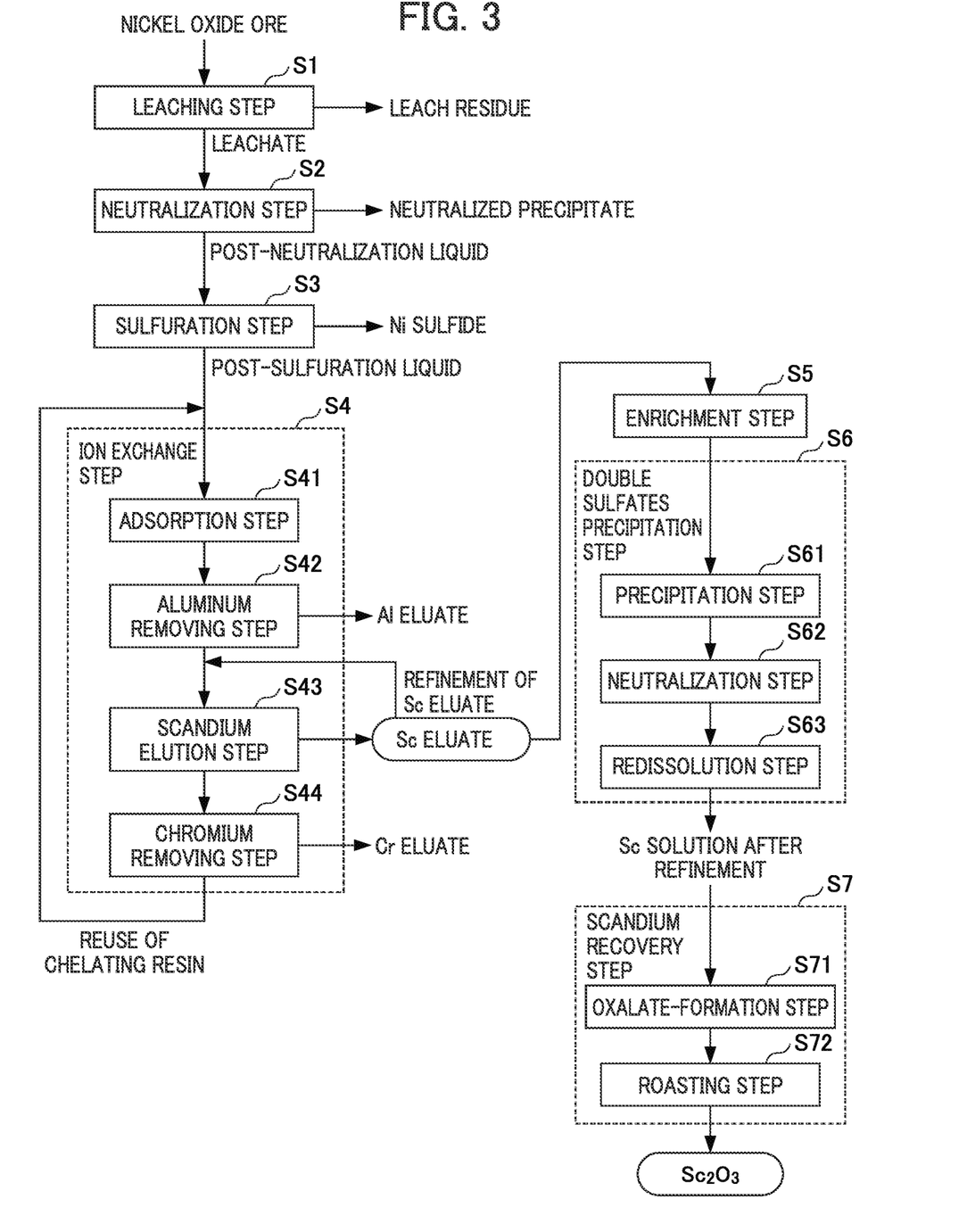
FIG. 3 is a flow diagram for illustrating the flow of performing an ion exchange treatment on the post-sulfuration liquid obtained by a hydrometallurgy process of nickel oxide ore and recovering the scandium from the resulting scandium eluate as a raw material.

FIG. 3 is a flow diagram for illustrating the flow of performing an ion exchange treatment on the post-sulfuration liquid obtained through the hydrometallurgy process of nickel oxide ore and recovering scandium from the resulting scandium eluate as a raw material. Note that the hydrometallurgy process of nickel oxide ore (leaching step S1 to sulfuration step S3) is the same as the flow described above, and a description thereof is thus omitted here.

As illustrated in FIG. 3, the post-sulfuration liquid obtained through the hydrometallurgy process of nickel oxide ore is transferred to the treatment in the ion exchange step S4 and subjected to the ion exchange treatment. There is no particular limitation to the aspect (each step) of the ion exchange treatment, but as illustrated in FIG. 3, examples of the ion exchange treatment may include a treatment comprising: an adsorption step S41 of bringing the post-sulfuration liquid into contact with a chelating resin to allow scandium to be adsorbed by the chelating resin; an aluminum removing step S42 of allowing sulfuric acid to come into contact with the chelating resin to remove aluminum adsorbed by the chelating resin; a scandium elution step S43 of allowing sulfuric acid to come into contact with the chelating resin which has been subjected to the aluminum removing step S42 to obtain a scandium eluate; and a chromium removing step S44 of allowing sulfuric acid to come into contact with the chelating resin which has been subjected to the scandium elution step S43 to remove chromium which has been adsorbed by the chelating resin in the adsorption step S41. Hereinafter, the overview of each step will be described.

[Adsorption Step]

In the adsorption step S41, the post-sulfuration liquid is brought into contact with a chelating resin to allow scandium to be adsorbed by the chelating resin. There is no particular limitation for the type of the chelating resin, and for example, a resin having iminodiacetic acid as a functional group can be used.

[Aluminum Removing Step]

In the aluminum removing step S42, the chelating resin which has adsorbed scandium in the adsorption step S21 is brought into contact with 0.1 N or less of sulfuric acid to remove aluminum adsorbed by the chelating resin. Note that when removing aluminum, the pH is preferably maintained in the range of between 1 or more and 2.5 or less, and more preferably maintained in the range of between 1.5 or more and 2.0 or less.

[Scandium Elution Step]

In the scandium elution step S43, the chelating resin which has been subjected to the aluminum removing step S22 is brought into contact with 0.3 N or more and less than 3 N of sulfuric acid to obtain a scandium eluent. When obtaining the scandium eluent, the normality of sulfuric acid used as an eluent is preferably maintained in the range of between 0.3 N or more and less than 3 N, and more preferably maintained in the range of between 0.5 N or more and less than 2 N.

[Chromium Removing Step]

In the chromium removing step S44, the chelating resin which has been subjected to the scandium elution step S23 is brought into contact with 3 N or more of sulfuric acid to remove chromium which has been adsorbed by the chelating resin. A normality of sulfuric acid used as an eluent of less than 3 N is not preferred when removing chromium because chromium may not be removed properly from the chelating resin.

Through such an ion exchange treatment, it is possible to obtain a scandium eluate from which various impurity elements such as aluminum and chromium are removed and in which scandium is enriched. Note that it is possible to increase the concentration of the scandium eluate by repeatedly subjecting the resulting scandium eluate to the same ion exchange treatment. The concentration of scandium to be recovered increases as the number of repetitions increases, but the number of repetitions is industrially preferably about 8 times or less since the degree of increase in concentration of scandium to be recovered decreases if the ion exchange treatment is repeated too many times. Note that the chelating resin recovered through the chromium removing step S44 in this ion exchange treatment can be reused again as a resin in the ion exchange treatment.

<2-3. Recovery of Scandium from Scandium Eluate>

In the method for recovering scandium according to the present embodiment, the scandium eluate obtained through the ion exchange treatment as described above can be used as a raw material. That is, as illustrated in the flow diagram of FIG. 3, scandium can be recovered in the form of scandium oxide through a double sulfates precipitation step S6 of generating a precipitate of double sulfates from the scandium eluate of the scandium-containing acidic solution and purifying the precipitate and a scandium recovery step S7 of recovering scandium from the scandium solution after purification.

[Double Sulfates Precipitation Step]

The double sulfates precipitation step S6 is the same as the "double sulfates precipitation step S11" in the flow diagram illustrated in FIG. 1, a detailed description thereof will be thus omitted here, but the double sulfates precipitation step S6 also comprises a precipitation step S61 of generating a precipitate of double sulfates from a scandium eluate of a scandium-containing acidic solution, a neutralization step S62 of neutralizing the solution obtained by dissolving the precipitate of double sulfates, and a redissolution step S63 of redissolving the scandium hydroxide obtained by neutralization in the same manner.

By performing a treatment to generate double sulfates of scandium from the scandium eluate obtained in this way, it is possible to efficiently separate scandium from the impurities and thus to recover high purity scandium without using expensive chemicals, solvents, and the like.

[Enrichment Step]

Note that a treatment to enrich the scandium eluate may be performed (enrichment step S5) before generating double sulfates of scandium from the scandium eluate in the double sulfates precipitation step S6.

Specifically, in the enrichment step S5, it is possible to separate scandium from impurities other than scandium by forming scandium contained in the scandium eluate into a precipitate and to perform an enrichment treatment to obtain an enriched scandium liquid by dissolving the precipitate of scandium generated with an acid such as sulfuric acid, hydrochloric acid, or nitric acid in the same manner as the enrichment step described above. Specific examples of the method for the enrichment treatment may include a method by neutralization for hydroxide formation or oxalate formation, or both the neutralization for hydroxide formation and the oxalate formation can be performed. By subjecting the scandium eluate to an enrichment treatment in this way, it is possible to greatly remove impurities contained in scandium eluate, to save the time and labor and the like for the treatment in the subsequent double sulfates precipitation step S6, and thus to cut down the cost. Note that the specific method for enrichment is the same as the above description, and a description thereof will be thus omitted here.

[Scandium Recovery Step]

In addition, the scandium recovery step S7 is the same as the "scandium recovery step S12" in the flow diagram illustrated in FIG. 1, a detailed description thereof will be thus omitted here, but the scandium recovery step S7 also comprises an oxalate-formation step S71 of adding oxalic acid to a scandium solution after purification that is obtained through the double sulfates precipitation step S6 to obtain crystals of scandium oxalate and a roasting step S72 of roasting the crystals of scandium oxalate obtained to obtain scandium oxide. Note that the method for recovering scandium from the scandium solution after purification is not limited to this.

By performing a treatment to generate, for example, solid crystals of scandium oxalate from the scandium solution after purification that is obtained through the double sulfates precipitation step S6 and to convert the resulting scandium oxalate into scandium oxide by roasting in this way, it is possible to recover high purity scandium in the form of scandium oxide.

EXAMPLES

Hereinafter, the present invention will be more specifically described with reference to Examples of the present invention, but the present invention is not limited to the following Examples in any way.

Example 1

[Generation of Acidic Solution Containing Scandium]

Pressurized acid leaching of nickel oxide ore with sulfuric acid was performed according to the known method such as the method described in Patent Document 1. The pH of the resulting leachate was adjusted to remove impurities, and then a sulfurizing agent was added to remove nickel, thereby obtaining a post-sulfuration liquid.

Next, the post-sulfuration liquid obtained was subjected to an ion exchange treatment using a chelating resin. Thereafter, 400 liters of a sulfuric acid solution having a concentration of 1 N was allowed to pass through the chelating resin to which scandium was adsorbed by this ion exchange treatment at a flow rate of 80 liters per minute (SV was 40).

The eluate discharged from the column was stored as a scandium eluate and sampled for analysis. The analysis results for the composition of various kinds of elements contained in the scandium eluate are shown in the following Table 1. Note that Cr, Mn, and Ca were below the measurable lower limit. In addition, the denotation "—" in Table 1 indicates that it has not been analyzed or is below the measurement lower limit.

TABLE 1

| Composition of scandium eluate [mg/L] | | | | | | | | | |
|---|---|---|---|---|---|---|---|---|---|
| Sc | Al | Fe | Ni | Mg | Cr | Mn | Ti | Ca | Co |
| 290 | 150 | 52 | 19 | 1 | <1 | <1 | — | <1 | — |

[Enrichment Step]

Next, sodium hydroxide was added to the scandium eluate having the composition shown in Table 2 to maintain the pH in a range of 6 to 7 and to generate a precipitate (precipitate of scandium hydroxide). Subsequently, sulfuric acid was added to the precipitate to dissolve the precipitate, thereby obtaining a hydroxide solution (scandium solution). The analysis results for the composition of various kinds of elements contained in the hydroxide solution obtained are shown in the following Table 2. Note that the denotation "—" in the analytical value display shown in Table 2 indicates that it was below the measurable lower limit. Note that Mg, Mn, and Ca were below the measurable lower limit. In addition, the denotation "—" in Table 2 indicates that it has not been analyzed or is below the measurement lower limit.

TABLE 2

| Composition of scandium solution [mg/L] | | | | | | | | | |
|---|---|---|---|---|---|---|---|---|---|
| Sc | Al | Fe | Ni | Mg | Cr | Mn | Ti | Ca | Co |
| 25,000 | 4,800 | 7,400 | 98 | <1 | 860 | <1 | — | <1 | — |

[Double Sulfates Precipitation Step]

Next, 35 mL of the scandium solution having the composition shown in Table 3 was used as a starting liquid for the treatment in the double sulfates precipitation step. Specifically, about 10 g of sodium sulfate corresponding to 300 g/L with respect to the liquid amount of this scandium solution was added to this scandium solution at room temperature and the mixture was stirred for about 30 minutes. As the double sulfates of scandium precipitated in the liquid by stirring, the precipitate of double sulfates of scandium was recovered by solid-liquid separation of this mixture, then mixed with 300 g/L of a sodium sulfate solution, and washed for 10 minutes, and the mixture was then subjected to solid-liquid separation in order to separate the mother liquor attached.

Subsequently, about 12 g (wet) of the precipitate of double sulfates of scandium after washing was mixed with pure water, and the mixture was then continuously stirred at room temperature until the entire amount of the precipitate was dissolved. After it was confirmed that almost the entire amount was dissolved, the mixture was separated into the undissolved residue and the solution of double sulfates of scandium by filtration. Note that the amount of pure water added at this time was 100 ml.

Subsequently, a neutralizing agent was added to the solution of double sulfates of scandium thus obtained to adjust the pH to 6 to 7, and the slurry after neutralization was subjected to solid-liquid separation to obtain scandium hydroxide after purification.

Thereafter, the scandium hydroxide thus obtained was redissolved with sulfuric acid to obtain a scandium solution after purification.

Here, the analysis results for the composition of the various kinds of elements contained in the solution of double sulfates of scandium in which the precipitate of double sulfates of scandium is dissolved in pure water are shown in Table 3, and the analysis results for the composition of the various kinds of elements contained in the scandium solution after purification are shown in Table 4. Note that the denotation "—" in Table 3 and Table 4 indicates that it has not been analyzed or is below the measurement lower limit.

TABLE 3

| Composition of solution of double sulfates of scandium [mg/L] | | | | | | | | | |
|---|---|---|---|---|---|---|---|---|---|
| Sc | Al | Fe | Ni | Mg | Cr | Mn | Ti | Ca | Co |
| 7,100 | 19 | 270 | <1 | <1 | 3 | <1 | — | <1 | — |

TABLE 4

| Composition of scandium solution after refinement [mg/L] | | | | | | | | | |
|---|---|---|---|---|---|---|---|---|---|
| Sc | Al | Fe | Ni | Mg | Cr | Mn | Ti | Ca | Co |
| 48,000 | 140 | 1,900 | 1 | <1 | 18 | <1 | — | 1 | — |

From the results shown in Tables 3 and 4, it can be seen that the impurity elements such as nickel contained in the scandium solution after the enrichment step were largely separated and removed through the treatment in the double sulfates precipitation step, and the amount of the impurity elements was thus decreased. The decreasing rates of the impurity elements are shown in the following Table 5. Note that the denotation "—" in Table 5 indicates that it has not been analyzed or is below the measurement lower limit.

TABLE 5

| Decreasing rate of impurity element [%] | | | | | | | | | |
|---|---|---|---|---|---|---|---|---|---|
| Sc | Al | Fe | Ni | Mg | Cr | Mn | Ti | Ca | Co |
| 6.2 | 98.4 | 85.3 | 99.4 | 87.2 | 98.7 | 89.2 | — | 92.1 | — |

[Oxalate-Formation Step]

Next, crystals of oxalic acid dihydrate (manufactured by MITSUBISHI GAS CHEMICAL COMPANY, INC.) to be two times the amount equivalent to the amount of scandium contained in the scandium solution after purification (Table 4) thus obtained as a calculated amount were dissolved in the scandium solution after purification, and the resulting solution was stirred and mixed for 60 minutes to generate a white crystalline precipitate of scandium oxalate.

[Roasting Step]

The crystalline precipitate of scandium oxalate obtained in the oxalate-formation step was suction filtered, washed with pure water, and dried at 105° C. for 8 hours. Thereafter, the scandium oxalate was placed in a tubular furnace and roasted (calcined) over 1 hour while maintaining the temperature at 1000° C. to 1100° C. to obtain scandium oxide ($Sc_2O_3$).

Scandium oxide obtained by roasting was quantitatively analyzed by using a known ICP analysis method. In addition, the existence form of each component was identified by an X-ray diffraction method. The analytical values of the components contained in scandium oxide are shown in the following Table 6 in terms of oxide. As shown in Table 6, it was possible to almost completely remove impurities other than scandium, particularly aluminum, nickel, uranium, and copper and to obtain extremely high purity scandium oxide having a purity of scandium thus recovered of higher than 99.9% as scandium oxide.

TABLE 6

Analytical value of component (in terms of oxide) contained in scandium oxide

| Sc ($Sc_2O_3$) | Al ($Al_2O_3$) | Fe ($Fe_2O_3$) | Ni (NiO) | Mg (MgO) | Cr ($Cr_2O_3$) | Mn ($MnO_2$) | Ti ($TiO_2$) | Ca (CaO) | Co (CoO) |
|---|---|---|---|---|---|---|---|---|---|
| >99.9 | <1 | 2 | 1 | 2 | <15 | <1 | <8 | 5 | <1 |

(Unit: "ppm" for elements excluding Sc, "% by mass" for Sc)

Comparative Example 1

The same treatment was performed by using the same nickel oxide ore as in Example 1 to generate a precipitate of a hydroxide from the chelate solution, and a solution (solution after the enrichment step) in which the precipitate was dissolved was obtained.

In Comparative Example 1, the solution was not subjected to the treatment in the double sulfates precipitation step. That is, the solution was subjected to the oxalate-formation treatment in the oxalate-formation step as it was, and the resulting crystalline precipitate of scandium oxalate was calcined to obtain scandium oxide.

The analytical values of the components contained in scandium oxide are shown in the following Table 7 in terms of oxide. As shown in Table 7, the grade of scandium oxide thus obtained was about 99.8%, and the purity up to 99.9% as in Examples was not obtained.

TABLE 7

Analytical value of component (in terms of oxide) contained in scandium oxide

| Sc ($Sc_2O_3$) | Al ($Al_2O_3$) | Fe ($Fe_2O_3$) | Ni (NiO) | Mg (MgO) | Cr ($Cr_2O_3$) | Mn ($MnO_2$) | Ti ($TiO_2$) | Ca (CaO) | Co (CoO) |
|---|---|---|---|---|---|---|---|---|---|
| 99.8 | 19 | 14 | 153 | 8 | <15 | 3 | <8 | 56 | <1 |

(Unit: "ppm" for elements excluding Sc, "% by mass" for Sc)

From the comparison between the results of Examples shown in Table 6 and the results of Comparative Examples shown in Table 7, it can be seen that it is possible to effectively decrease aluminum, iron, nickel, magnesium, manganese, and calcium which are impurity elements and thus to obtain high purity scandium oxide having stable purity higher than 99.9% according to the method in Examples.

The invention claimed is:

1. A method for recovering scandium, comprising:
    obtaining a scandium solution after purification from an acidic solution containing scandium by a purification procedure including the following steps [A] to [C]; and subsequently recovering scandium from the scandium solution obtained:
        [A] a precipitation step of adding sodium sulfate to the acidic solution containing scandium to obtain a precipitate of double sulfates of scandium,
        [B] a neutralization step of adding pure water to the precipitate of double sulfates of scandium obtained in the precipitation step to dissolve the precipitate and adding a neutralizing agent to a resulting solution to obtain scandium hydroxide, and
        [C] a redissolution step of adding an acid to scandium hydroxide obtained in the neutralization step to obtain a scandium solution after purification having scandium hydroxide dissolved.

2. The method for recovering scandium according to claim 1, comprising an enrichment step of generating a precipitate of scandium from the acidic solution containing scandium and adding an acid to the precipitate to dissolve the precipitate, wherein an acidic solution obtained in the enrichment step is subjected to a treatment in the purification procedure.

3. The method for recovering scandium according to claim 2, wherein a neutralizing agent or oxalic acid is added to the acidic solution containing scandium to generate the precipitate of scandium and an acid is added to the precipitate to dissolve the precipitate in the enrichment step.

4. The method for recovering scandium according to claim 2, wherein the enrichment step comprises:
    a first enrichment step of adding a neutralizing agent to the acidic solution containing scandium to generate a precipitate of scandium and adding an acid to the precipitate to dissolve the precipitate; and
    a second enrichment step of adding oxalic acid to the solution obtained in the first enrichment step to generate a precipitate of scandium oxalate and adding an acid to the precipitate to dissolve the precipitate.

5. The method for recovering scandium according to claim 1, comprising an oxalate-formation step of adding oxalic acid to the scandium solution after purification to obtain a crystal of scandium oxalate, wherein
    the crystal of scandium oxalate obtained in the oxalate-formation step is subjected to a treatment in a roasting step.

6. The method for recovering scandium according to claim 1, wherein scandium hydroxide is obtained by adjusting a pH of the resulting solution in step [B] to a range of 8 to 9 by addition of a neutralizing agent in the neutralization step.

7. The method for recovering scandium according to claim 1, wherein the acidic solution containing scandium is a scandium eluate obtained through a leaching step of leaching the nickel oxide ore with
sulfuric acid to obtain a leachate,
a neutralization step of adding a neutralizing agent to the
leachate to obtain a neutralized precipitate containing
impurities and a post-neutralization liquid,
sulfide and a post-sulfuration liquid, and
an ion exchange step of bringing the post-sulfuration
liquid into contact with a chelating resin to allow
scandium contained in the post-sulfuration liquid to be
adsorbed by the chelating resin and thus to obtain the
scandium eluate.

8. The method for recovering scandium according to claim 2, comprising an oxalate-formation step of adding oxalic acid to the scandium solution after purification to obtain a crystal of scandium oxalate, wherein
the crystal of scandium oxalate obtained in the oxalate-formation step is subjected to a treatment in a roasting step.

9. The method for recovering scandium according to claim 3, comprising an oxalate-formation step of adding oxalic acid to the scandium solution after purification to obtain a crystal of scandium oxalate, wherein
the crystal of scandium oxalate obtained in the oxalate-formation step is subjected to a treatment in a roasting step.

10. The method for recovering scandium according to claim 4, comprising an oxalate-formation step of adding oxalic acid to the scandium solution after purification to obtain a crystal of scandium oxalate, wherein
the crystal of scandium oxalate obtained in the oxalate-formation step is subjected to a treatment in a roasting step.

11. The method for recovering scandium according to claim 2, wherein scandium hydroxide is obtained by adjusting a pH of the resulting solution in step [B] to a range of 8 to 9 by addition of a neutralizing agent in the neutralization step.

12. The method for recovering scandium according to claim 3, wherein scandium hydroxide is obtained by adjusting a pH of the resulting solution in step [B] to a range of 8 to 9 by addition of a neutralizing agent in the neutralization step.

13. The method for recovering scandium according to claim 4, wherein scandium hydroxide is obtained by adjusting a pH of the resulting solution in step [B] to a range of 8 to 9 by addition of a neutralizing agent in the neutralization step.

14. The method for recovering scandium according to claim 5, wherein scandium hydroxide is obtained by adjusting a pH of the resulting solution in step [B] to a range of 8 to 9 by addition of a neutralizing agent in the neutralization step.

15. The method for recovering scandium according to claim 8, wherein scandium hydroxide is obtained by adjusting a pH of the resulting solution in step [B] to a range of 8 to 9 by addition of a neutralizing agent in the neutralization step.

16. The method for recovering scandium according to claim 2, wherein the acidic solution containing scandium is a scandium eluate obtained through
a leaching step of leaching the nickel oxide ore with sulfuric acid under high temperature and high pressure to obtain a leachate,
a neutralization step of adding a neutralizing agent to the leachate to obtain a neutralized precipitate containing impurities and a post-neutralization liquid,
a sulfuration step of adding a sulfurizing agent to the post-neutralization liquid to obtain a nickel sulfide and a post-sulfuration liquid, and
an ion exchange step of bringing the post-sulfuration liquid into contact with a chelating resin to allow scandium contained in the post-sulfuration liquid to be adsorbed by the chelating resin and thus to obtain the scandium eluate.

17. The method for recovering scandium according to claim 3, wherein the acidic solution containing scandium is a scandium eluate obtained through
a leaching step of leaching the nickel oxide ore with sulfuric acid to obtain a leachate,
a neutralization step of adding a neutralizing agent to the leachate to obtain a neutralized precipitate containing impurities and a post-neutralization liquid,
a sulfuration step of adding a sulfurizing agent to the post-neutralization liquid to obtain a nickel sulfide and a post-sulfuration liquid, and
an ion exchange step of bringing the post-sulfuration liquid into contact with a chelating resin to allow scandium contained in the post-sulfuration liquid to be adsorbed by the chelating resin and thus to obtain the scandium eluate.

18. The method for recovering scandium according to claim 4, wherein the acidic solution containing scandium is a scandium eluate obtained through
a leaching step of leaching the nickel oxide ore with sulfuric acid to obtain a leachate,
a neutralization step of adding a neutralizing agent to the leachate to obtain a neutralized precipitate containing impurities and a post-neutralization liquid,
a sulfuration step of adding a sulfurizing agent to the post-neutralization liquid to obtain a nickel sulfide and a post-sulfuration liquid, and
an ion exchange step of bringing the post-sulfuration liquid into contact with a chelating resin to allow scandium contained in the post-sulfuration liquid to be adsorbed by the chelating resin and thus to obtain the scandium eluate.

19. The method for recovering scandium according to claim 5, wherein the acidic solution containing scandium is a scandium eluate obtained through
a leaching step of leaching the nickel oxide ore with sulfuric acid to obtain a leachate,
a neutralization step of adding a neutralizing agent to the leachate to obtain a neutralized precipitate containing impurities and a post-neutralization liquid,
a sulfuration step of adding a sulfurizing agent to the post-neutralization liquid to obtain a nickel sulfide and a post-sulfuration liquid, and
an ion exchange step of bringing the post-sulfuration liquid into contact with a chelating resin to allow scandium contained in the post-sulfuration liquid to be adsorbed by the chelating resin and thus to obtain the scandium eluate.

20. The method for recovering scandium according to claim 6, wherein the acidic solution containing scandium is a scandium eluate obtained through
a leaching step of leaching the nickel oxide ore with sulfuric acid to obtain a leachate,
a neutralization step of adding a neutralizing agent to the leachate to obtain a neutralized precipitate containing impurities and a post-neutralization liquid,
a sulfuration step of adding a sulfurizing agent to the post-neutralization liquid to obtain a nickel sulfide and a post-sulfuration liquid, and an ion exchange step of bringing the post-sulfuration liquid into contact with a chelating resin to allow scandium contained in the post-sulfuration liquid to be adsorbed by the chelating resin and thus to obtain the scandium eluate.

* * * * *